United States Patent [19]
Ranke

[11] 3,975,172
[45] Aug. 17, 1976

[54] RECOVERY OF GASEOUS COMPONENTS FROM SCRUBBING LIQUID

[75] Inventor: Gerhard Ranke, Pocking, Germany

[73] Assignee: Linde Aktiengesellschaft, Wiesbaden, Germany

[22] Filed: Mar. 14, 1974

[21] Appl. No.: 451,044

[30] Foreign Application Priority Data
Mar. 14, 1973 Germany............................ 2312754

[52] U.S. Cl........................................ 55/40; 55/48; 55/51; 55/73; 55/94
[51] Int. Cl.²........................................ B01D 47/06
[58] Field of Search ............... 55/40, 48, 51, 46, 43, 55/93, 94, 233, 73, 68

[56] References Cited
UNITED STATES PATENTS

| | | |
|---|---|---|
| 3,023,843 | 3/1962 | Grubb et al............................ 55/48 |
| 3,201,920 | 8/1965 | Grubb et al............................ 55/48 |
| 3,236,030 | 2/1966 | Von Tress............................ 55/48 X |
| 3,492,788 | 2/1970 | Hochgesand et al. .................. 55/48 |
| 3,770,622 | 11/1973 | Freireich et al. ........................ 55/68 |

FOREIGN PATENTS OR APPLICATIONS

832,143   1952   Germany ............................... 55/46

Primary Examiner—John Adee
Attorney, Agent, or Firm—Millen, Raptes & White

[57] ABSTRACT

Process for the recovery of one or more components of a raw gas, absorbed by the scrubbing liquid during a physical gas scrubbing step, by expanding the laden scrubbing liquid, characterized in that the expanded, laden scrubbing liquid is stripped, before its final regeneration, with a gas consisting exclusively of one or more components of the raw gas and essentially free of the components to be recovered and to be scrubbed out.

12 Claims, 1 Drawing Figure

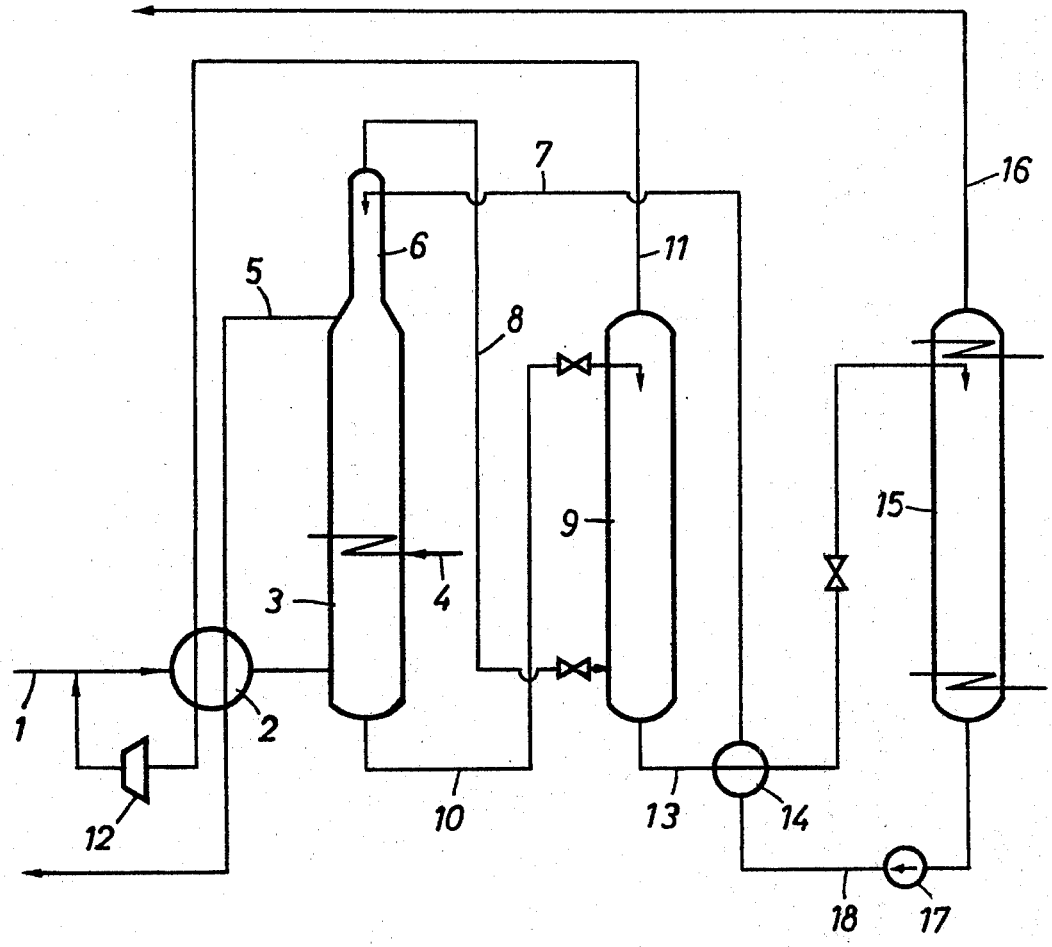

RECOVERY OF GASEOUS COMPONENTS FROM SCRUBBING LIQUID

BACKGROUND OF THE INVENTION

This invention relates to a process and apparatus for the recovery of one or more components of a raw gas, absorbed by the scrubbing liquid during a physical gas scrubbing step, by expanding the laden scrubbing liquid. (By laden or loaded scrubbing liquid is meant scrubbing liquid containing absorbed gaseous components.)

In a physical gas washing procedure, other components contained in the raw gas are dissolved in addition to the component to be scrubbed out, the amount of dissolved gas being proportional to the partial pressure and the solubility of the individual gases.

If these concomitantly dissolved components are desirable as constituents of the product gas, this phenomenon represents a not inconsiderable loss in yield, so that a recovery of these valuable components is advantageous.

A process for the recovery of such valuable components has been disclosed wherein the loaded scrubbing liquid is expanded and a thus-produced gaseous fraction, containing the largest portion of the concomitantly dissolved components and a partial quantity of the component to be scrubbed out, is re-mixed with the gas, after recompression to the raw gas pressure, while the liquid fraction is conducted to a further regenerating stage.

Such a process is applicable in many cases and is also economical. For example, if it is intended to scrub out acidic components, from a raw gas obtained from a plant for the partial oxidation of, for example, sulfur-containing crude oils, which raw gas contains, hydrogen, hydrogen sulfide, carbon dioxide, carbon monoxide, methane, and nitrogen, to obtain the hydrogen as a product gas, then, by means of a simple expansion in the described manner, such an amount of hydrogen can be recovered from the loaded scrubbing liquid that the hydrogen yield is above 99%. This is possible, because the relative solubilities of hydrogen to carbon dioxide is very high.

In contrast thereto, if it is desired that the product gas contain methane in addition to hydrogen, which is very advantageous if the product gas is to be employed as heating gas or as the starting product for synthetic natural gas, then the methane cannot be recovered sufficiently completely by a simple expansion, since the solubilities of methane and carbon dioxide are relatively close to each other. Moreover, a large portion of the dissolved carbon dioxide is degassed during the expansion, thereby requiring increased compression energy for the recompression of the gas, and simultaneously the amount of the carbon dioxide to be scrubbed out from the raw gas is also increased.

Therefore, this invention is based on the problem of developing a more efficient process and apparatus for the recovery of high yields of valuable components concomitantly dissolved in a scrubbing liquid.

SUMMARY

This problem is solved according to the invention by stripping the expanded, loaded scrubbing liquid before its final regeneration with a gas consisting exclusively of one or more components of the raw gas and essentially free of the components to be recovered and to be scrubbed out.

Since this stripping gas is essentially free of any components to be scrubbed out of the raw gas and of any components to be stripped out of the laden scrubbing liquid, the latter is almost entirely freed of the concomitantly dissolved components desired in the product gas so that, prior to the final regeneration, the scrubbing liquid is laden almost exclusively with components to be scrubbed out. The laden stripping gas is composed of components contained in the raw gas and either being harmless to or desirable in the product gas and therefore can again be admixed to the raw gas to improve the yield, without deleterious consequences, after recompression.

A particularly advantageous further development of the idea of the present invention resides in that a portion of the product gas treated with the regenerated scrubbing liquid and subsequently expanded is utilized as the stripping gas. With the aid of this method, which is both simple and advantageous, a stripping gas is obtained which can only contain components of the raw gas and which, with a sufficiently intensive treatment of the product gas with regenerated scrubbing liquid, is essentially free of components to be recovered as well as of components to be scrubbed out. The stripping gas is obtained in the course of the scrubbing process, thus eliminating sources foreign to the plant.

By "essentially free of the components to be recovered and to be scrubbed out" is meant a very low content of these components.

The content of the components which are to be stripped from the laden scrubbing liquid by means of the stripping gas depends on the necessary amount of stripping gas and on the amount of the available scrubbing agent. The more complete the valuable components can be scrubbed out in the scrubbing column the better they can be stripped out of the laden scrubbing agent afterwards.

In order to minimize the losses in the laden scrubbing agent after the stripping column, one endeavours to scrub out the valuable components at the head of the column to an amount of 90 to 99 percent. In case of a gas containing 30 mol percent methane this would mean a methane content of 3 and 0.3 mol percent, respectively, in the stripping gas. In contrast, if it is desired to produce the components of the raw gas scrubbed out in the scrubbing column with as a high purity as possible, it is, in certain circumstances, necessary to scrub out the components to be stripped out still better, e.g. to an amount of 99.9 percent. So in case of a gas containing 30 mol percent methane the stripping gas would contain 0.03 mol percent methane.

The stripping gas containing the valuable components can be admixed to the product gas. However, it is especially advantageous to compress the laden stripping gas to the raw gas pressure and admixing it to the raw gas.

An apparatus to carry out the process comprises essentially a scrubbing column, a stripping column, and a regenerating column, wherein the scrubbing column is extended past the withdrawal point for the product gas. Thereby, a portion of the product gas can be treated, above the discharge point for this product gas, with fresh, regenerated scrubbing liquid, until the stripping gas fulfills the required conditions, i.e. has the demanded purity.

Further details of the invention will be explained in greater detail with reference to a schematically illustrated example, reference being directed to the attached drawing.

In the example, a raw gas from a plant for the partial oxidation of sulfur-containing crude oil is treated with methanol as the washing liquid. The raw gas contains 32.7 mol percent of hydrogen, 38.1 mol percent of acid gas, consisting of 1.4 mol percent of hydrogen sulfide and 36.7 mol percent of carbon dioxide, as well as 11.9 mol percent of carbon monoxide and nitrogen, and 17.3 mol percent of methane, wherein especially the methane is to be recovered as the starting material for the production of synthetic natural gas.

100,000 Nm$^3$/h. of raw gas flows under a pressure of 67 atmospheres absolute and at a temperature of 308 K via a conduit 1 and a heat exchanger 2 into the lower section of a scrubbing column 3, equipped with an ammonia refrigerating cycle 4, and is treated therein with methanol.

From the upper portion of the scrubbing column 3, via a conduit 5, 62,500 Nm$^3$/h. of product gas is withdrawn, consisting of 51.8 mole percent of hydrogen, 18.9 mol percent of carbon monoxide and nitrogen, 27.7 mol percent of methane, and 1.6 mol percent of carbon dioxide, and is heated against raw gas in the heat exchanger 2 to about 298 K before leaving the plant. At the head of an upper section 6 of the scrubbing column 3, representing the extension of the scrubbing column 3 according to this invention, a portion of the product gas is treated with the entire, freshly regenerated methanol amounting to 160 Nm$^3$/h., introduced via a conduit 7 at the head of the scrubbing section 6 at a temperature of 213 K, and thus this portion of the product gas is almost completely freed of all components, except for hydrogen.

When removing acid gas from cracked gases, hydrogen is always contained in the product gas. If the product gas is to be employed for the production of synthetic natural gas, it is advantageous to work toward a maximally high methane content during the cracking process. Since methane represents the final product and, on the other hand, can also be produced by methanization from three parts of hydrogen and one part of carbon monoxide, it is readily seen that maximum importance must be attributed to the recovery of methane, while an equally large loss of hydrogen is merely equal to a loss of one-third of the product.

The solubility of hydrogen is, in most solvents, markedly lower than that of methane. In case of methanol, the solubility ratio at a temperature of 233 K, for example, is 1 : 12, while, for instance, the solubility ratio of methane to carbon dioxide is 1 : 15, wherein this ratio is dependent to a greater extent on the temperature, the pressure, and the concentration.

Since the amount of scrubbing agent for scrubbing out the acidic gaseous components is fixedly determined at a given pressure by the solubility of carbon dioxide, it is possible to scrub out the methane from a small amount of gas at the head of the scrubbing column 3 with the aid of the entire amount of methanol, thereby to obtain a stripping gas which consists practically only of hydrogen and is free of methane.

2,500 Nm$^3$/h. of this gas consisting of 84.3 mol percent of hydrogen, 15.6 mol percent of carbon monoxide and nitrogen, and 0.1 mol percent of methane is now utilized, in accordance with this invention, as the stripping gas and fed, after expansion to an intermediate pressure of 21 atm. abs., via conduit 8 into a stripping column 9 at the foot thereof, where it absorbs, countercurrently to laden scrubbing liquid withdrawn from the scrubbing column 3 via a conduit 10, likewise expanded to 21 atm. abs., and introduced at the head of the stripping column 9, the methane contained in this scrubbing liquid.

From the head of the stripping column 9, 11,200 Nm$^3$/h. of methane-containing stripping gas, composed of 20.2 mol percent of hydrogen, 6.5 mol percent of carbon monoxide and nitrogen, 20.3 mol percent of methane, 52.4 mol percent of carbon monoxide, and 0.6 mol percent of hydrogen sulfide, is withdrawn via a conduit 11, warmed in heat exchanger 2 countercurrently to entering raw gas, recompressed in a compressor 12 to the raw gas pressure of 67 atm. abs., and thereafter admixed to the raw gas in conduit 1.

At the foot of the stripping column 9, a scrubbing liquid loaded especially with acidic gaseous components is withdrawn via a conduit 13 and is fed via a heat exchanger 14, after expansion to 2 atm. abs., to the head of a regenerating column 15. In the regenerating column 15, heated with steam at the foot and cooled at the head with cooling water, 37,500 Nm$^3$/h. of acidic gaseous components are driven off, consisting of 95.1 mol percent of carbon dioxide and 2.6 mol percent of hydrogen sulfide, and discharged at the head via a conduit 16, while the regenerated methanol is conducted, via a conduit 18, with the aid of a pump 17 by way of the heat exchanger 14 and via the conduit 7 to the head of the scrubbing section 6 of the scrubbing column 3.

The cold balance of the plant is not changed by the additional scrubbing section 6, since the scrubbing liquid must anyway be saturated with the raw gas components in accordance with the temperature and the partial pressure.

The process of this invention is not limited to the recovery of methane, but rather can be applied quite generally if at least three components with markedly different solubilities are contained in the raw gas.

For example, the process of the present invention can also be utilized if the component to be scrubbed out of the raw gas is to be obtained in a maximally pure form. Thus, when producing acetylene from a cracked gas containing, in addition to acetylene, also ethylene, methane, and hydrogen, it is possible to drive off, from the scrubbing liquid mainly laden with acetylene, the concomitantly dissolved ethylene and methane by stripping with hydrogen without it being necessary to recycle the acetylene as the stripping gas. Since the solubility of hydrogen is very much lower as compared to that of acetylene, it is also possible to attain the required purity of the acetylene by means of this process.

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A process comprising the steps of (a) scrubbing raw gas with a scrubbing liquid so as to substantially free it from all components which are intended to be removed as impurities from the raw gas as well as a portion of components which are desired products, said raw gas being thereby converted into a first product gas, a part thereof being withdrawn as product; (b) further scrubbing another part of the first product gas with substantially completely regenerated scrubbing liquid, so as to free said part substantially completely from the remainder of said components desired as products in the first product gas, thus yielding a second product gas; (c) stripping resultant laden scrubbing liquid with said second product gas to obtain a laden stripping gas containing said portion of components which are desired products; and (d) subjecting resultant stripped scrubbing liquid to a final regeneration step to obtain a substantially completely regenerated scrubbing liquid.

2. A process according to claim 1, further comprising compressing resultant laden stripping gas to the raw gas pressure and admixing resultant compressed laden stripping gas to the raw gas.

3. A process according to claim 1, said raw gas being a gas obtained from the partial oxidation of a sulfur-containing crude oil, said raw gas containing hydrogen, hydrogen sulfide; carbon dioxide, carbon monoxide, nitrogen and methane, said first product gas being a mixture of methane, hydrogen, nitrogen, and carbon oxides and said second product gas being hydrogen essentially free of methane.

4. A process according to claim 3, said scrubbing liquid being methanol.

5. A process according to claim 1, said scrubbing liquid being methanol.

6. A process according to claim 1 wherein said final regenerating step is thermal regeneration.

7. A process according to claim 1 wherein scrubbing liquid employed in step (a) is laden scrubbing liquid withdrawn from step (b).

8. A process according to claim 1 wherein said resultant laden scrubbing liquid in step (c) is laden scrubbing liquid withdrawn from step (a).

9. A process according to claim 1 wherein the laden scrubbing liquid is expanded in step (c).

10. A process according to claim 7 wherein said resultant laden scrubbing liquid in step (c) is laden scrubbing liquid withdrawn from step (a).

11. A process according to claim 10 wherein the laden scrubbing liquid is expanded in step (c).

12. A process according to claim 11 wherein said final regenerating step is thermal regeneration.

* * * * *